United States Patent
Nicolas

(10) Patent No.: US 8,369,890 B2
(45) Date of Patent: Feb. 5, 2013

(54) MOBILE ELECTRONIC DEVICE WITH AN ILLUMINATED STATIC DISPLAY

(75) Inventor: Alberto Soto Nicolas, Tampere (FI)

(73) Assignee: Nokia Corporation, Espoo (FI)

( * ) Notice: Subject to any disclaimer, the term of this patent is extended or adjusted under 35 U.S.C. 154(b) by 546 days.

(21) Appl. No.: 12/300,273

(22) PCT Filed: Jun. 22, 2006

(86) PCT No.: PCT/EP2006/006010
§ 371 (c)(1),
(2), (4) Date: Jun. 10, 2009

(87) PCT Pub. No.: WO2007/147425
PCT Pub. Date: Dec. 27, 2007

(65) Prior Publication Data
US 2009/0312063 A1   Dec. 17, 2009

(51) Int. Cl.
*H04M 1/00* (2006.01)
(52) U.S. Cl. .............. 455/556.1; 455/550.1; 455/575.1; 455/566; 348/790
(58) Field of Classification Search ............. 455/556.1, 455/550.1, 575.1, 566; 348/207.99, 790; 315/169.3
See application file for complete search history.

(56) References Cited

U.S. PATENT DOCUMENTS

| | | | |
|---|---|---|---|
| 6,879,112 B2 * | 4/2005 | Kubota et al. | 315/169.3 |
| 6,970,723 B2 * | 11/2005 | Chigira | 455/566 |
| 7,336,980 B1 * | 2/2008 | Kaikuranta et al. | 455/575.6 |
| 2003/0036412 A1 | 2/2003 | Chong | |
| 2003/0064759 A1 * | 4/2003 | Kurokawa et al. | 455/566 |
| 2003/0222988 A1 * | 12/2003 | Koreki et al. | 348/207.99 |
| 2005/0073829 A1 | 4/2005 | Burger et al. | |
| 2005/0101314 A1 * | 5/2005 | Levi | 455/423 |
| 2006/0052063 A1 | 3/2006 | Lohr | |
| 2006/0192749 A1 * | 8/2006 | Lowles et al. | 345/102 |
| 2007/0159299 A1 * | 7/2007 | Tsai | 340/10.1 |
| 2007/0291188 A1 * | 12/2007 | Wernersson | 348/790 |

FOREIGN PATENT DOCUMENTS

| | | |
|---|---|---|
| DE | 19918055 A1 | 11/2000 |
| WO | 02098006 A | 12/2002 |

OTHER PUBLICATIONS

International Search Report dated Mar. 14, 2007.

* cited by examiner

*Primary Examiner* — Danh Le
(74) *Attorney, Agent, or Firm* — Harrington & Smith

(57) ABSTRACT

A mobile electronic device provided with a static display that can be activated by a processor upon events in the mobile electronic device for alerting a user. A mobile electronic device provided with a flexible display that follows curved surfaces of the housing of the device and can be wrapped around corners and edges of the mobile electronic device.

10 Claims, 8 Drawing Sheets

MOBILE ELECTRONIC DEVICE WITH AN ILLUMINATED STATIC DISPLAY

CROSS REFERENCE TO RELATED APPLICATIONS

This application is the National Stage of International Application No. PCT/EP2006/006010 International Filing Date, 22 Jun. 2006, which designated the United States of America, and which International Application was published under PCT Article 21 (2) as WO Publication No. WO2007/147425, the disclosure of which is incorporated herein by reference in its entirety.

BACKGROUND

1. Field

The disclosed embodiments relate to mobile electronic devices that are provided with a display for providing the user with information or for alerting the user of events.

2. Brief Description of Related Developments

Users of electronic devices, such as mobile phones are alerted of events, such as an incoming call or a received SMS via a variety of alerting means in conventional mobile phones. These alerting means include audible signals, such as ringing tones, vibration, and lighting up of the display. Lighting up of the display is particularly useful in environments where ringing tones are considered to be disturbing and for hearing-impaired users. However, the backlighting of the LCD displays consumes relatively large amount of energy, thereby reducing battery lifetime of the mobile electric device. The battery lifetime is always an important characteristic of a mobile electronic device and therefore there is a desire to reduce the energy consumption of the mobile electronic device. Further, some types of mobile electronic devices do not include an LCD display, or the LCD display is covered in certain situations, for example in a closed clamshell type mobile telephone. Further, there is a desire for displaying information on the cover of mobile electronic devices on areas that are not conventionally occupied by a display.

SUMMARY

On this background, an aspect of the disclosed embodiments provides a mobile electronic device with improved alerting means. One embodiment provides a mobile electronic device comprising a housing, a cover that forms a part of the housing, a static display at a portion of the cover, a processor, and lighting for illuminating the static display, the lighting being coupled to the processor, and the processor being configured to illuminate the static display with the lighting upon an event in the electronic device for alerting a user.

The static display can be illuminated with LEDs or other lighting that uses relatively little energy. Thereby, the alerting function costs relatively little energy and the battery lifetime is extended. Further, the static display could be printed on the inside or outside of the cover, or be molded into the cover at any position on the device. The static display could be placed on a practically any position on the mobile electronic device, thereby providing a great design flexibility. For example a clamshell type device wherein the display is not visible in the closed position of the device, could easily be provided with a static display on the parts of the housing or cover that are visible when the device is in the closed position to provide a optical alerting means that is visible when the device is closed.

The event can be triggered by a program run on the device. The event could also be a change in status of the mobile electronic device, such as an incoming call, a received message, a change in battery, etc.

Preferably, the static display contains a graphical representation of an optical illusion. Thus, the activated display is eye-catching and therefore not easily overlooked. The optical illusion may create the impression that the displayed image is moving.

Alternatively, the static display can be configured to show a plurality of different images through the changes in the illumination of the static display. The change of displayed image can be caused by a change in illumination color. The change in displayed image can also be caused by a change in the portion of the static display that is illuminated.

Preferably, the processor and the display are configured to create the impression of a moving image by changing the images shown on the static display.

Another aspect of the disclosed embodiments provides a mobile electronic device in which information can be shown to the user and positions of the device that are conventionally not occupied by a display. One embodiment provides a mobile electronic device comprising a housing, a cover that forms a part of the housing, and a flexible display under the cover, in which at least the area of the cover above the flexible display is transparent and the flexible display substantially follows the shape of the cover.

Thus, it becomes possible to place the display in curved areas of the mobile electronic device. Thereby, the range of positions on the mobile device where a display can be placed a significantly increased.

Preferably, the mobile electronic device further comprises a processor controlling the operation of the electronic device, wherein the display is coupled to the controller and the controller is configured to alert a user by information or an image shown on the display.

A portion of the area of the cover where the flexible display is located may be curved.

The flexible display may follow the shape of the cover over edges of the cover.

Another aspect of the disclosed embodiments provides a method for alerting a user of a mobile electronic device comprising activating of a static display containing an optical effect or optical illusion by illuminating the static display.

Thus, a method is provided that is effective for alerting the user in an environment where audible signals are undesirable or where the user cannot perceive audible alerts.

The method may further comprise changing an image shown on the static display by changing the illumination behind the static display One embodiment provides a mobile electronic device comprising a housing that includes at least two housing parts that are movable relative to one another between two stable positions, the housing being provided with a graphic containing an optical illusion that is visible to a user in one or both of the stable positions and not visible or only partially visible to a user when the movable parts are not in one of the stable positions.

By providing an optical illusion that is visible in one of the stable positions or in both stable positions, the user receives an effective, easily recognizable optical feedback that a stable position has been achieved. Typically, a stable position is connected with a particular function of the mobile electronic device and the user has a confirmation that this function can be used when the highly noticeable optical illusion becomes visible.

The one or more optical illusions may change from one stable position to the other.

Further aspects, features, advantages and properties of the mobile electronic device and method according to the disclosed embodiments will become apparent from the detailed description.

BRIEF DESCRIPTION OF THE DRAWINGS

In the following detailed portion of the present description, the disclosed embodiments will be explained in more detail with reference to the exemplary embodiments shown in the drawings, in which.

DETAILED DESCRIPTION OF THE DRAWINGS

In the following detailed description, the device and the method according to the disclosed embodiments in the form of a personal computer, PDA, mobile terminal or a mobile communication terminal in the form of a cellular/mobile phone, will be described by the preferred embodiments. The disclosed embodiments can, however, also be carried out with any other electronic device the operation of which is controlled by a processor.

Figure 1:
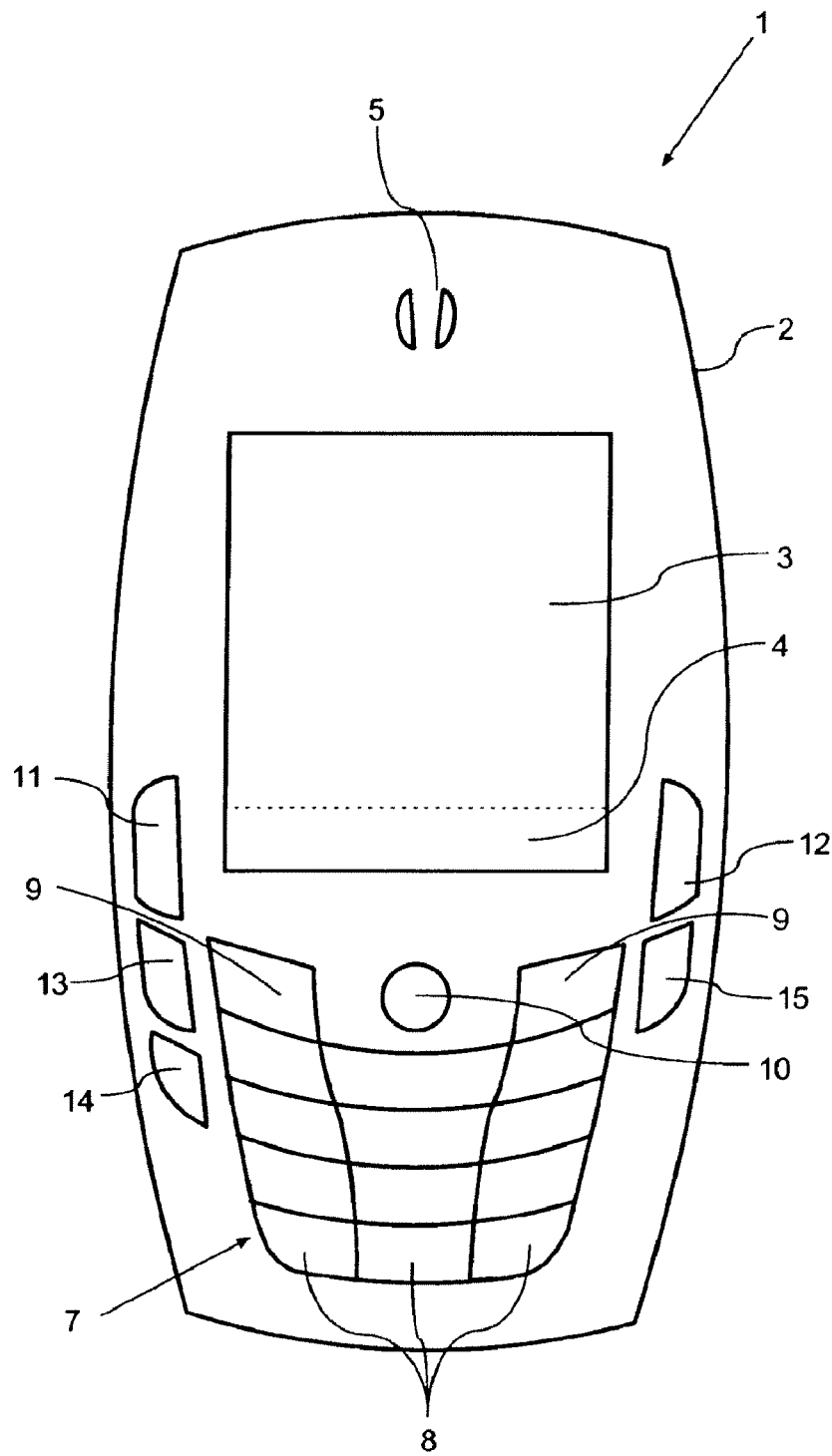
FIG. 1 is a diagrammatic front view on a mobile electronic device according to a first embodiment.

FIG. 1 illustrates a first embodiment of a mobile terminal according to the disclosed embodiments in the form of a mobile telephone by a front view. The mobile phone 1 comprises a user interface having a housing 2, a display 3, an on/off button (not shown), a speaker 5 (only the openings are shown), and a microphone 6 (not visible in FIG. 1). The phone 1 according to the first preferred embodiment is adapted for communication via a cellular network, such as the GSM 900/1800 MHz network, but could just as well be adapted for use with a Code Division Multiple Access (CDMA) network, a 3G network, or a TCP/IP-based network to cover a possible VoIP-network (e.g. via WLAN, WIMAX or similar) or a mix of VOIP and Cellular such as UMA (Universal Mobile Access).

The keypad 7 has a first group of keys 8 as alphanumeric keys, by means of which the user can enter a telephone number, write a text message (SMS), write a name (associated with the phone number), etc. Each of the twelve alphanumeric keys 8 is provided with a figure "0-9" or a sign "#" or "*", respectively. In alpha mode each key is associated with a number of letters and special signs used in the text editing.

The keypad 7 has additionally a second group of keys comprising two softkeys 9, two call handling keys (offhook key 11 and onhook key 12), and a 5-way navigation key 10 (up, down, left, right and center: select/activate). The function of the softkeys 9 depends on the state of the phone, and navigation in the menu is performed by using the navigation-key. The present function of the softkeys 9 is shown in separate fields (soft labels) in a dedicated area 4 of the display 3, just above the softkeys 9. The two call handling keys 11,12 are used for establishing a call or a conference call, terminating a call or rejecting an incoming call.

The navigation key 10 is a four- or five-way key which can be used for cursor movement, scrolling and selecting (five-way key) and is placed centrally on the front surface of the phone between the display 3 and the group of alphanumeric keys 7. A dedicated menu key 13 gives direct access to the menu structure and a copy and paste key 14 assist in collaboration with the softkeys in copying and pasting text or graphics. A dedicated clear key 15 serves to delete items.

The mobile phone 1 has a flat display 3 that is typically made of an LCD with optional back lighting, such as a TFT matrix capable of displaying color images. A touch screen (not shown) may be applied on top of the LCD display 3.

Figure 2A:
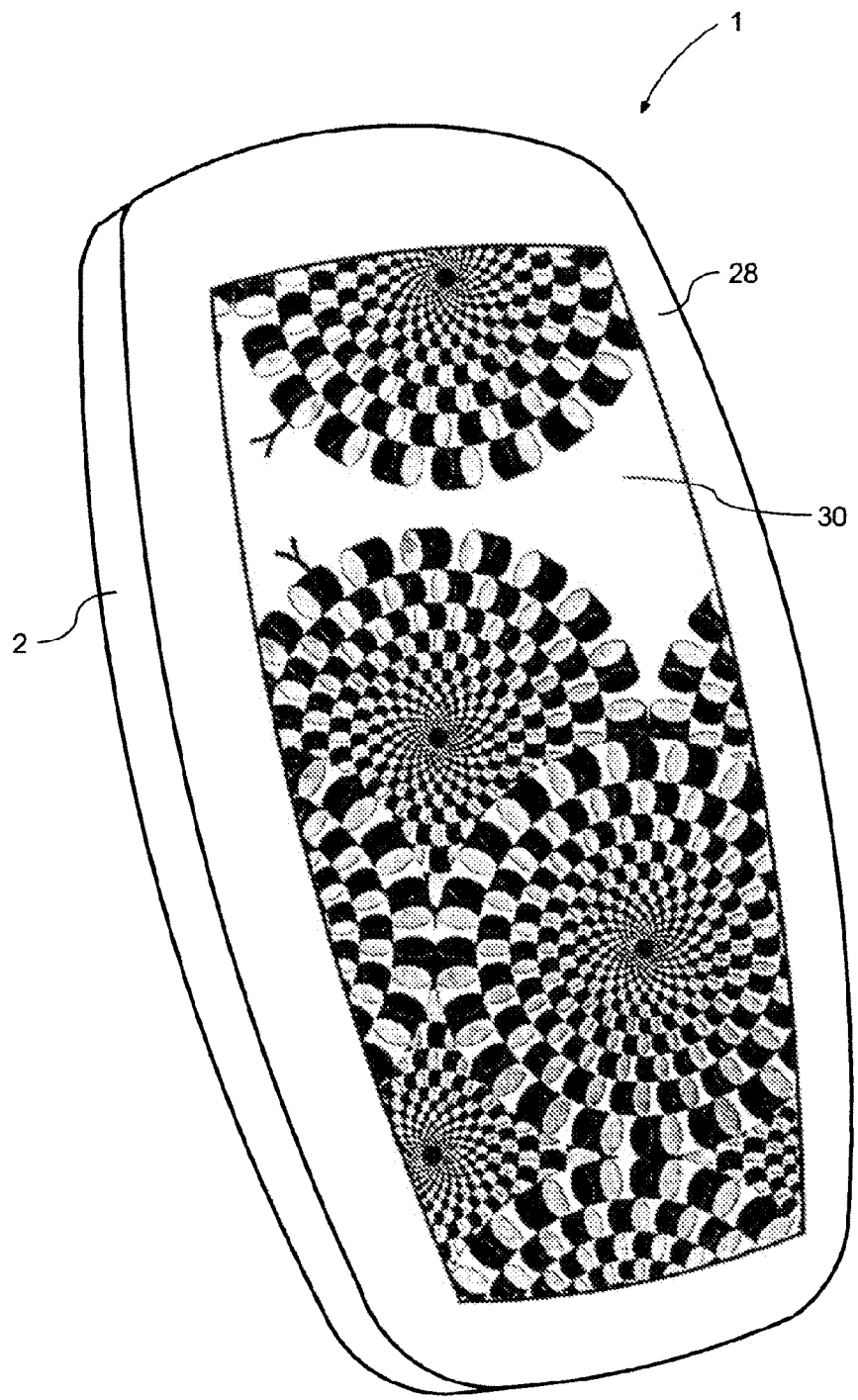
FIG. 2A is an elevated view on rear side of the device according to FIG. 1.

FIG. 2A shows the rear of the mobile phone 1. A releasable rear cover 28 gives access to the SIM card (FIG. 4), and the battery pack (FIG. 4) in the back of the mobile phone 1 that supplies electrical power for the electronic components of the mobile phone 1.

The rear cover 28 is provided with a static display 30. The static display 30 is provided with backlighting that is controlled by the mobile phone. In this embodiment the static display 30 includes an image of an optical illusion which gives the user the impression that the image on the static display is moving. Thereby, the image is easier noticed. The image is such that it is difficult to notice the image when the backlighting is not switched on and the image is easy to notice when the backlighting is switched on. The static display can be formed by a print on the rear side of a transparent part of the cover or the static print can be an integral part of the cover or printed on the outside of the cover. The backlighting may use light guides and/or LEDs. The static display 30 does not need to be placed in the middle of the rear cover 28, it could be placed on any position on the housing 2.

Figure 2B:
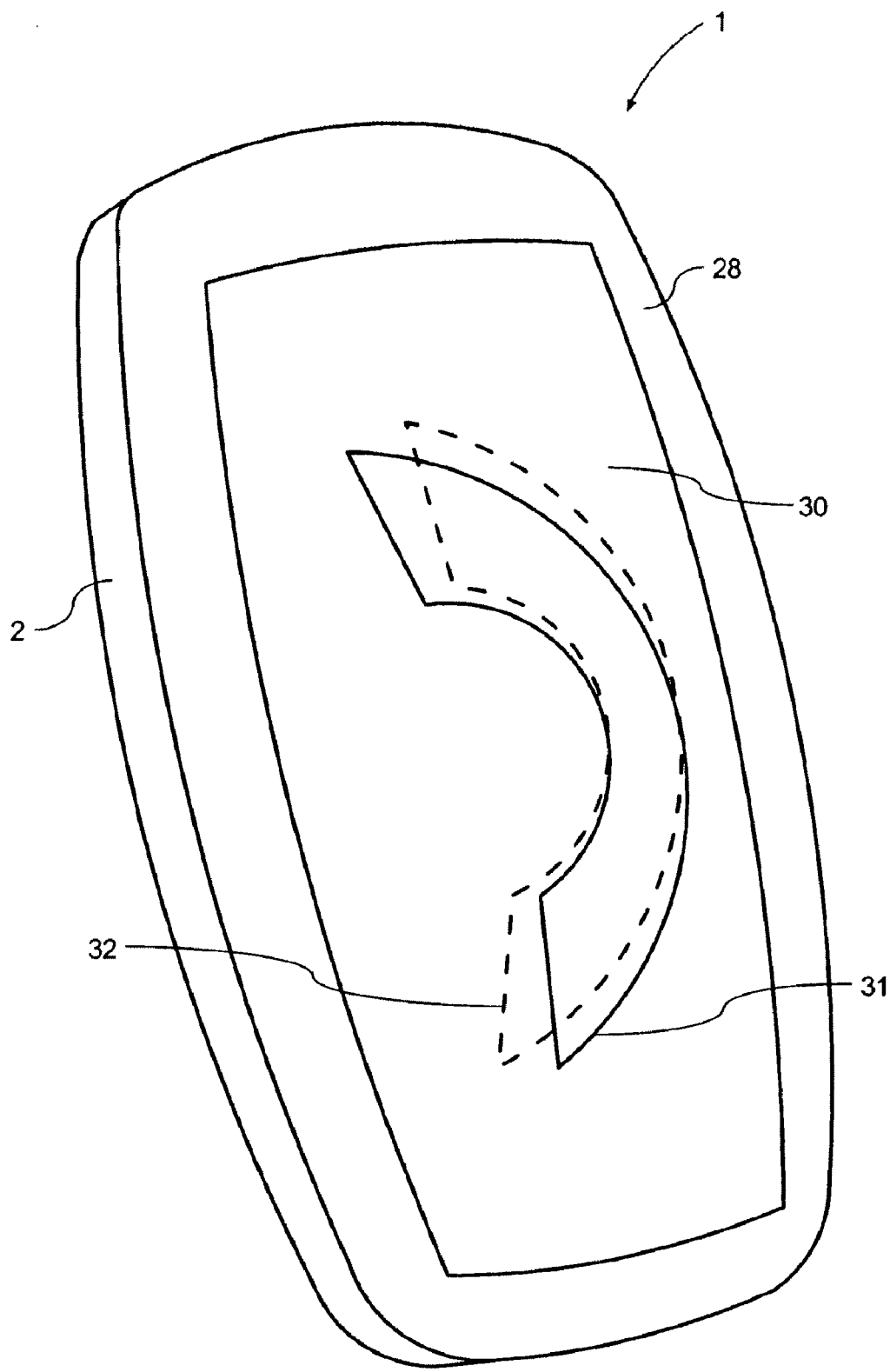
FIG. 2B is an elevated view on rear side of a variation of the device according to FIG. 1.
Figure 3:
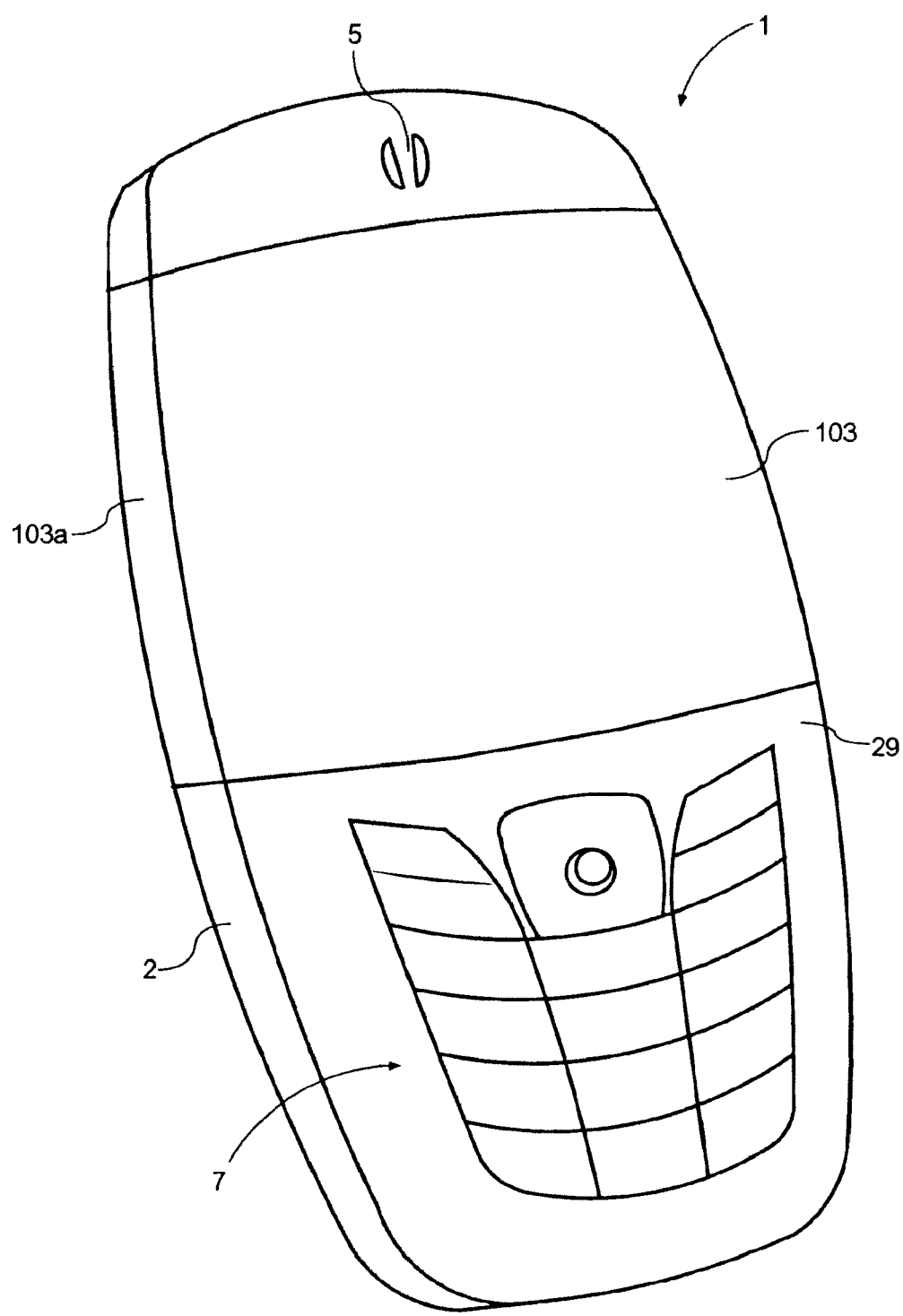
FIG. 3 is an elevated view on front side of a mobile electronic device according a second embodiment.

FIG. 2B shows a variation of the above described embodiment, in which the static display comprises two images 31 and 32 that can be alternatively activated. In the present case the static display shows a receiver of a phone in two different positions. By alternatively activating the one image and the other image an animation of a "ringing" phone is created. The selective activation is based on the activation of different parts of the static display 30 that is divided into narrow strips that can be illuminated separately under control from a processor inside the mobile phone 1. Alternatively, the change of the image is obtained by activating LEDs with a different color, whereby different images are becoming visible depending on the color of the activated LED. The FIG. 3 shows a second embodiment of the mobile electronic device 1 according to the disclosed embodiments. The mobile electronic device according to the second embodiment is essentially identical to the mobile electronic device of the first embodiment above and the operation of the device is also essentially identical to the operation of the device of the first embodiment described above. However, the second embodiment does not necessarily include a static display. The device is a mobile phone 1, with a keypad 7 that is substantially identical to the keypad of the mobile phone to the embodiment above. The operation of such a keypad and such a type of mobile phone has already been described above and will therefore not be repeated here. The display 103 is however of a flexible type.

The flexible display 103 is disposed under a transparent part of the front cover 29 and follows the curved surface of the front cover 29. The flexible display 103 follows the shape of the front cover 29 also around the two front edges of the front cover 29 so that the flexible display has a portion 103a that is disposed on the left side of the mobile phone 1 and another portion disposed on the right side of the mobile phone 1 (this right side portion of the display 103 cannot be seen in FIG. 3).

Alternatively, the flexible display 103 can be disposed at any other (less conventional) position on the mobile electronic device 1, such as on the top and/or bottom and on the sides and the rear of the mobile phone (not shown). The flexible display 103 can also be applied to electronic devices that do not have the candy bar shape housing, such as for example mobile electronic devices with clamshell, sliding or rotating type housings that consist of two or more housing parts.

Figure 4:
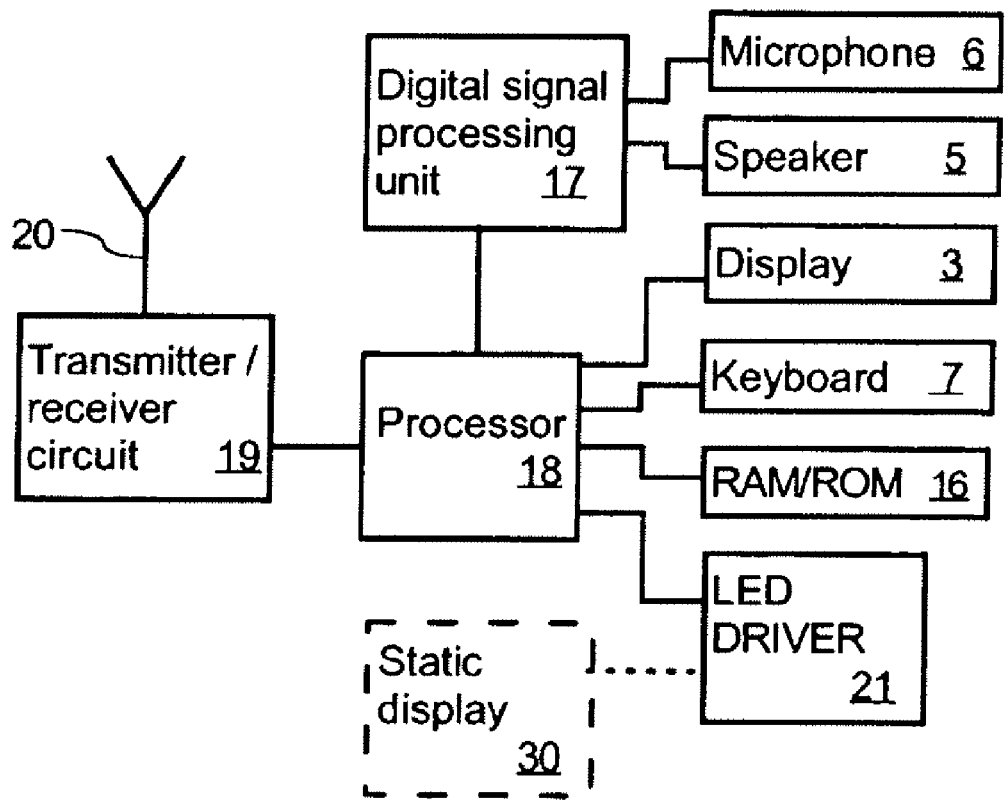
FIG. 4 is a block diagram illustrating the general architecture for both the first and second embodiment of the mobile electronic device according to the disclosed embodiments.

FIG. 4 illustrates in block diagram form the general architecture of a mobile phone 1 constructed in accordance with the disclosed embodiments. A processor 18 controls the communication with the cellular network via the transmitter/receiver circuit 19 and an internal antenna 20. A microphone 6 transforms the user's speech into analogue signals, the analogue signals formed thereby are A/D converted in an A/D converter (not shown) before the speech is encoded in a digital signal processing unit 17 (DSP). The encoded speech signal is transferred to the processor 18, which e.g. supports the GSM terminal software. The processor 18 also forms the interface to the peripheral units of the apparatus, including a RAM memory and a ROM or Flash ROM memory 16, the graphical display 3, the LED driver 21 and keypad 7 (as well as data, power supply, etc.). The digital signal-processing unit 17 speech-decodes the signal, which is transferred from the processor 18 to the speaker 5 via a D/A converter (not shown)

With respect to the embodiment that includes the static display, the processor 18 controls the activation of the backlighting of the static display 30 by activating the appropriate LEDs (not shown) via the LED driver 21. The LEDs are connected to the backlighting via a light guides (not shown) that lead to the light from the LEDs to the display 30. The software in the ROM memory 16 instructs the processor 18 when to activate and deactivate the static display 30. The activation of the static display 30 is programmable and application specific. As an example, the software for a handling the telephone communication functions of the mobile phone 1 instructs the processor 18 to activate the static display 30 upon detection of an incoming call and upon detection of a received message, such as an SMS or e-mail message. The activation may be intermittent to further increase the noticeability of the alert. Other applications, such as for example a calendar function could also activate the static display for alerting the user. The event that triggers the activation of the static display 30 can also be a passive event, such as a battery status change.

Figure 5:
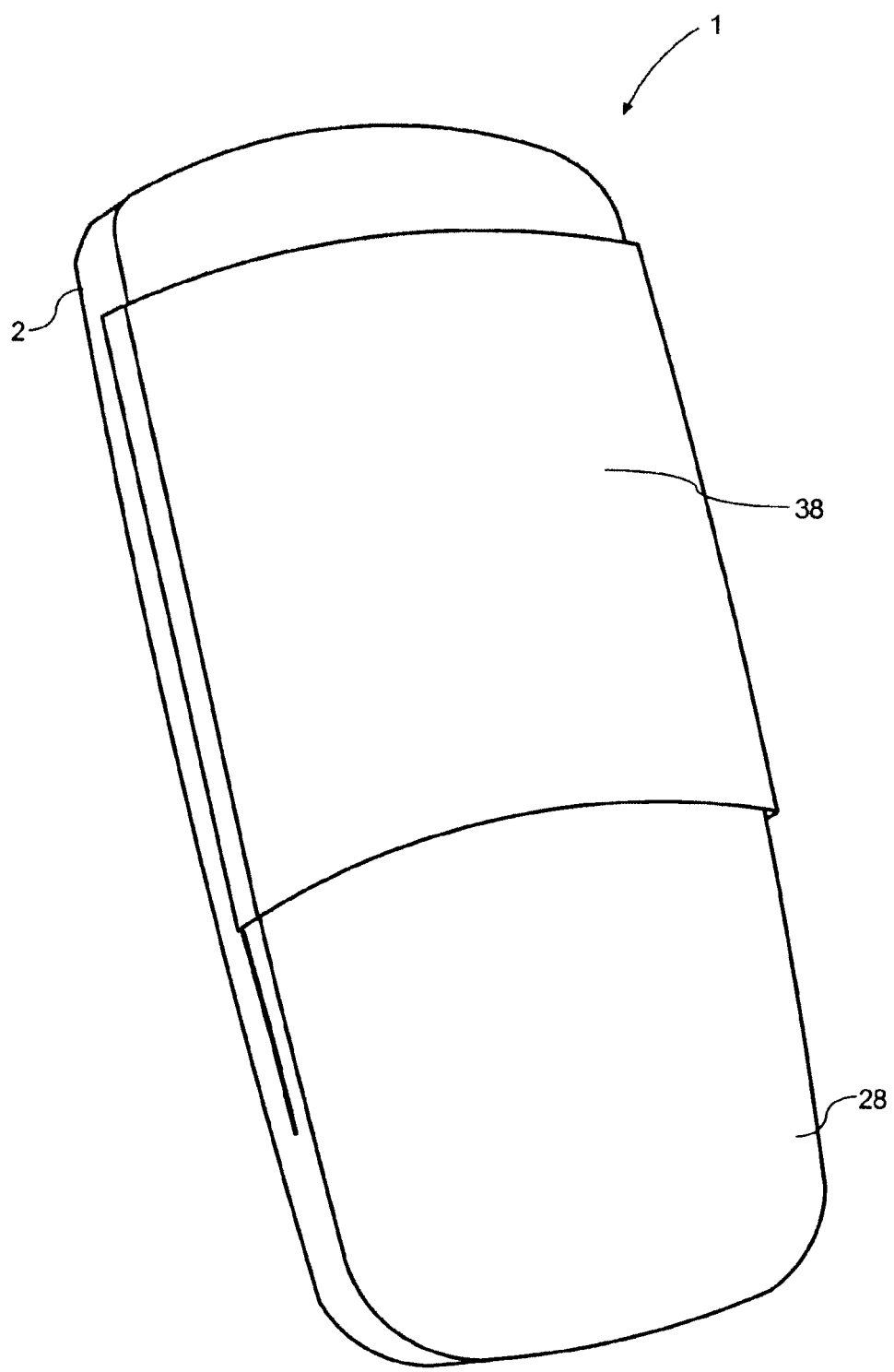
FIG. 5 is an elevated view on the rear side of a mobile electronic device according a third embodiment that is provided with a slidable cover.
Figure 6:
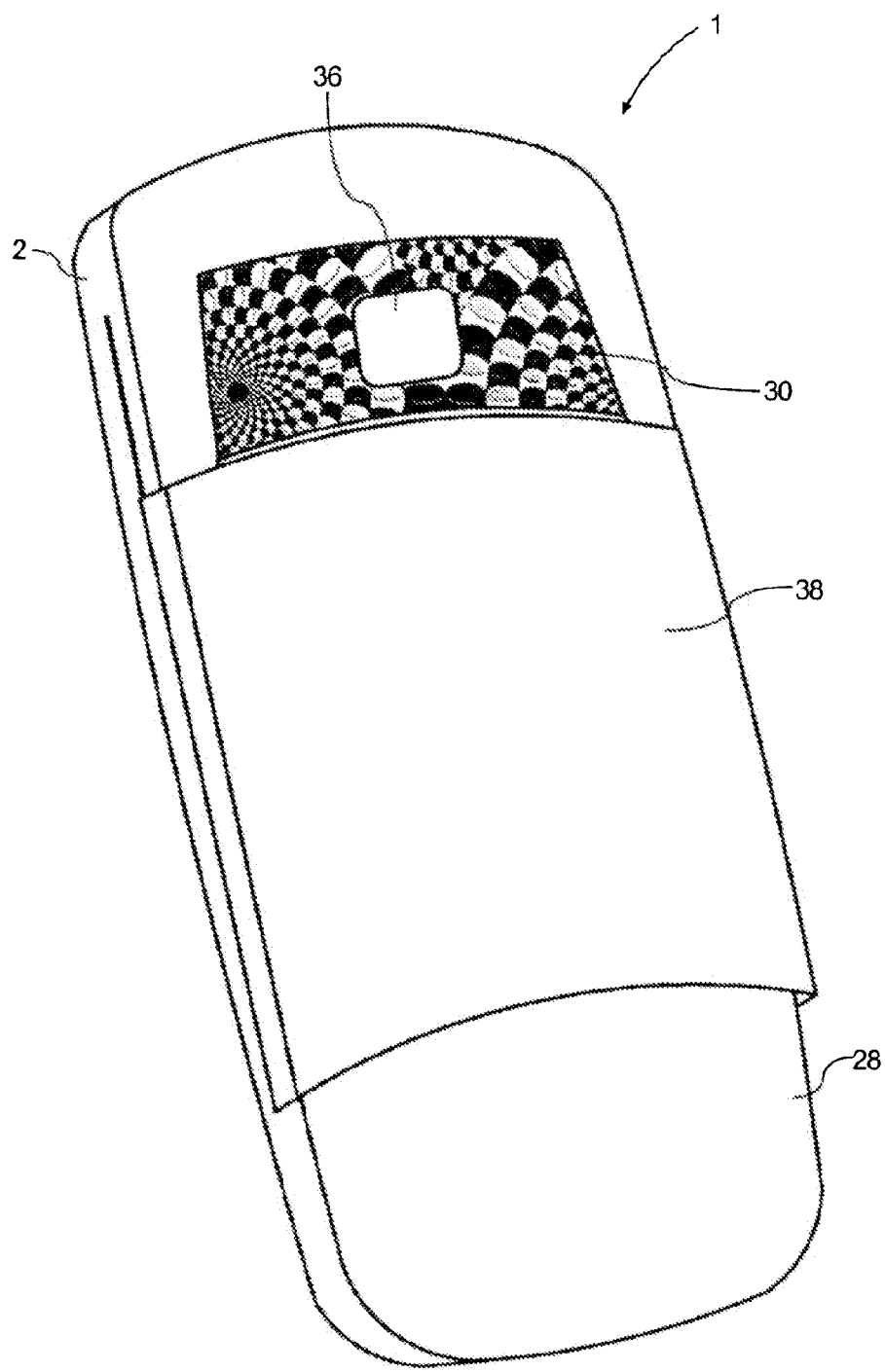
FIG. 6 is the view of FIG. 5 with the slidable cover in another position.

FIGS. 5 and 6 show a third embodiment of the mobile electronic device 1 according to the disclosed embodiments. The mobile electronic device according to the second embodiment is essentially identical to the mobile electronic device of the first embodiment above and the operation of the device is also essentially identical to the operation of the device of the first embodiment described above. However, the mobile electronic device according to the third embodiment is provided with a slidable will rear cover 38. The slidable rear cover 38 can assume two stable positions. One of these two stable positions is the upper position shown in FIG. 5, in which a camera lens and a graphic containing an optical illusion are covered. The other of the two stable positions is the lower position shown in FIG. 6, in which the camera lens 36 and the optical illusion 30 are uncovered. The slidable rear cover can be moved back and forth between the two stable positions by the user applying force to be slidable rear cover 38. A bi-stable spring mechanism (not shown) can be used to facilitate the sliding movement between the two positions and to ensure that the two end positions are stable.

Figure 7:
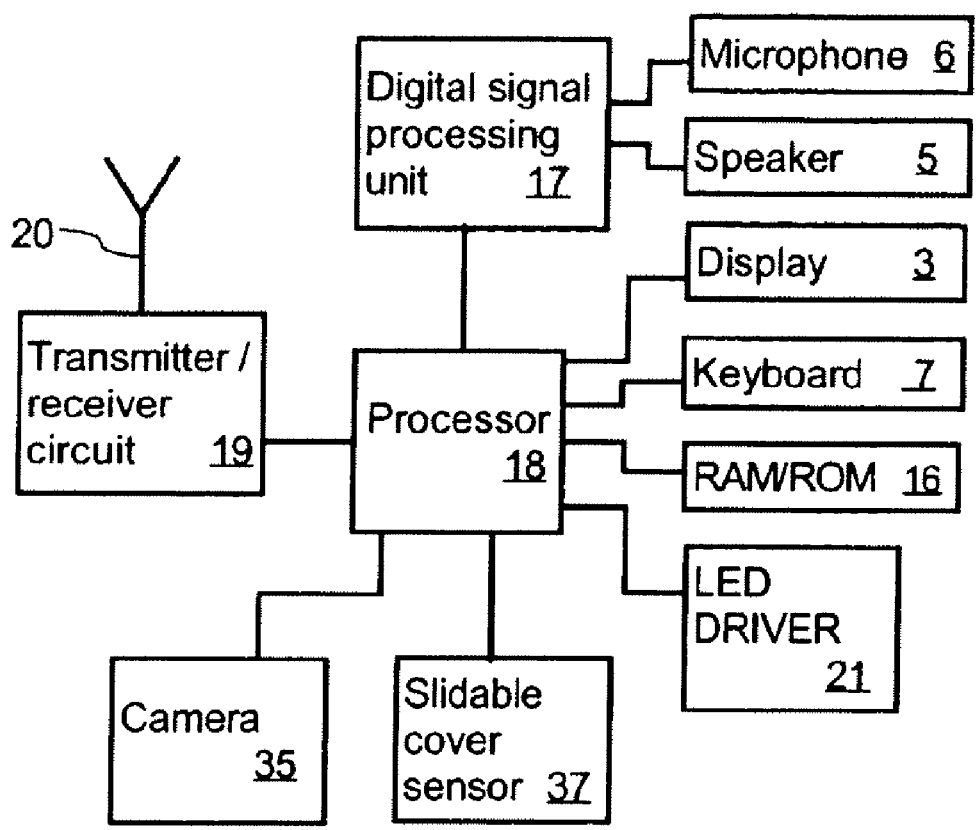
FIG. 7 is a block diagram illustrating the general architecture for third embodiment of the mobile electronic device.

FIG. 7 illustrates in block diagram form the general architecture of a mobile phone 1 constructed in accordance with the third embodiment. The general architecture is essentially the same as for the first and second embodiment, however a camera 35 and a sensor 37 for detecting the position of the slidable cover 38 are added to the architecture and coupled to the processor 18. Thus, the processor 18 can activate a camera function on the mobile phone 1 when the slidable cover 38 is moved to the lower position and also the deactivate a camera function on the mobile phone 1 when the slidable cover 38 is moved back to the upper position.

The user gets a clear indication that the stable lower position has been achieved since the optical illusion 30 is completely visible when the slidable cover 38 has reached the lower stable position. Since the optical illusion is very noticeable because it gives the impression that the in itself static image is moving, the user gets a very easy to recognize visible feedback to confirm that the mobile phone 1 is now ready for shooting pictures or moving video.

The slidable rear cover that uncovers a graphic containing an optical illusion is not limited to a slidable type cover or to a rear cover. Any other movable part of a mobile electronic device that is capable of covering and uncovering a graphic could be used in combination with the optical illusion to indicate to the user that a stable position has been obtained when the optical illusion has become visible. The movable part could be hinged, or suspended in other ways from the mobile electronic device. This concept is not limited to use in connection with a camera lens. Instead, the optical illusion can for example be provided in connection with a slide type mobile phone housing in which two parts of the phone slide relative to one another to uncover and cover a keypad. A graphical image containing an optical illusion can surround the keypad or can be provided adjacent the keypad.

According to embodiment (not shown) the housing of the mobile electronic device may be provided with two graphics that each contain an optical illusion, whereby the one of the two optical illusions can be seen in one of said stable positions and the other of said optical illusions can be seen in the other stable position.

The term "comprising" as used in the claims does not exclude other elements or steps. The term "a" or "an" as used in the claims does not exclude a plurality. The single processor or other unit may fulfill the functions of several means recited in the claims.

Although the disclosed embodiments has been described in detail for purpose of illustration, it is understood that such detail is solely for that purpose, and variations can be made therein by those skilled in the art without departing from the scope of the disclosed embodiments.

The invention claimed is:

1. A mobile electronic device comprising a housing, a cover that forms a part of the housing, where the cover at least partially forms a static display, a processor, and lighting for illuminating the static display, said lighting being coupled to the processor, and the processor being configured to illuminate the static display with said lighting upon an event in the electronic device for alerting a user.

2. The mobile electronic device according to claim 1, wherein said event is triggered by a program run on the device.

3. The mobile electronic device according to claim 1, wherein the event is a change in status of the mobile electronic device.

4. The mobile electronic device according to claim 1, wherein the static display contains a graphical representation of an optical illusion.

5. The mobile electronic device according to claim 4, wherein the optical illusion creates the impression that the displayed image is moving.

6. The mobile electronic device according to claim 1, wherein said static display is configured to show a plurality of different images through the changes in the illumination of the static display.

7. The mobile electronic device according to claim 6, wherein the displayed image is changed by change in illumination color.

8. The mobile electric device according to claim 6, wherein the displayed image is changed by a change in the portions of the static display that are being illuminated.

9. The mobile device according to claim 6, wherein the processor and the display are configured to create the impression of a moving image by changing the images shown on the static display.

10. An apparatus comprising:
a housing including a cover that forms a part of the housing, where a portion of the cover at least partially forms a static display;
an electronic display connected to the housing;
a processor connected to the electronic display; and
a lighting source connected to the processor, where the lighting source is configured to at least partially illuminate the static display, where the processor is configured to cause the lighting source to illuminate the static display upon an event in the apparatus for alerting a user.

\* \* \* \* \*